(12) United States Patent
Meiri et al.

(10) Patent No.: US 11,513,705 B2
(45) Date of Patent: Nov. 29, 2022

(54) SYSTEM AND METHOD FOR VOLUME POLARIZATION ACROSS MULTIPLE STORAGE SYSTEMS

(71) Applicant: EMC IP Holding Company, LLC, Hopkinton, MA (US)

(72) Inventors: David Meiri, Somerville, MA (US); Xiangping Chen, Sherborn, MA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 0 days.

(21) Appl. No.: 17/234,054

(22) Filed: Apr. 19, 2021

(65) Prior Publication Data

US 2022/0334743 A1 Oct. 20, 2022

(51) Int. Cl.
*G06F 3/06* (2006.01)

(52) U.S. Cl.
CPC ............ *G06F 3/0634* (2013.01); *G06F 3/061* (2013.01); *G06F 3/0614* (2013.01); *G06F 3/0689* (2013.01)

(58) Field of Classification Search
CPC ......... G06F 3/0634; G06F 3/061; G06F 3/089
See application file for complete search history.

(56) References Cited

U.S. PATENT DOCUMENTS

| | | | |
|---|---|---|---|
| 8,386,836 B2 * | 2/2013 | Burger | G06F 11/073 714/6.13 |
| 2010/0023814 A1 * | 1/2010 | Sundrani | G06F 11/1092 714/E11.03 |
| 2020/0026617 A1 * | 1/2020 | Killamsetti | G06F 11/2097 |

* cited by examiner

*Primary Examiner* — Baboucarr Faal
(74) *Attorney, Agent, or Firm* — Brian J. Colandreo; Mark H. Whittenberger; Holland & Knight LLP

(57) ABSTRACT

A method, computer program product, and computing system for dividing a plurality of volumes replicated across a pair of storage systems into one or more consistency groups. A polarization state may be defined for each consistency group. An input-output (IO) failure associated with at least one consistency group may be detected. At least a portion of the at least one consistency group may be polarized based upon, at least in part, the polarization state defined for the at least one consistency group.

20 Claims, 8 Drawing Sheets

SYSTEM AND METHOD FOR VOLUME POLARIZATION ACROSS MULTIPLE STORAGE SYSTEMS

BACKGROUND

Storing and safeguarding electronic content may be beneficial in modern business and elsewhere. Accordingly, various methodologies may be employed to protect and distribute such electronic content.

For example, multiple storage systems may be configured in an active/active relationship where the two storage systems present a single volume. The volume data may be available through paths going to both storage systems. Every write operation to one storage system may be replicated to the other storage system synchronously. The two storage systems may maintain a cluster between them (e.g., via a Time to Live (TTL) mechanism, where a "preferred" storage system grants TTL to its peer, the "non-preferred" storage system). In this configuration, once the TTL expires for the non-preferred storage system, the non-preferred storage system may go offline. In particular, once it is impossible to replicate IO write requests between the two storage systems within the TTL, one of the storage systems must stop servicing all IO requests to the host before allowing the other storage system to proceed. This process is generally referred to as polarization.

However, when multiple volumes are replicated between storage systems, problems may arise when polarizing the volumes. For example, polarizing individual volumes may result in data loss for groups of volumes, while polarizing large portions or even all volumes may result in significant recovery times and performance penalties for the storage systems.

SUMMARY OF DISCLOSURE

In one example implementation, a computer-implemented method executed on a computing device may include, but is not limited to, dividing a plurality of volumes replicated across a pair of storage systems into one or more consistency groups. A polarization state may be defined for each consistency group. An input-output (IO) failure associated with at least one consistency group may be detected. At least a portion of the at least one consistency group may be polarized based upon, at least in part, the polarization state defined for the at least one consistency group.

One or more of the following example features may be included. Defining the polarization state for each consistency group may include defining the polarization state as one of: online, partially polarized, and fully polarized. Polarizing at least a portion of the at least one consistency group based upon, at least in part, the polarization state defined for the at least one consistency group may include: determining that the polarization state for a consistency group is online; polarizing at least a portion of the consistency group using a witness node; identifying an active storage system and a passive storage system; defining a bias for the consistency group; and updating the polarization state for the consistency group to partially polarized. Polarizing at least a portion of the at least one consistency group based upon, at least in part, the polarization state defined for the at least one consistency group may include: determining that the polarization state for the consistency group is partially polarized; and polarizing at least a portion of the consistency group based upon, at least in part, the bias defined for the consistency group. It may be determined whether each volume of the consistency group has been polarized. In response to determining that each volume of the consistency group has not been polarized, the polarization state for the consistency group may be maintained as partially polarized. In response to determining that each volume of the consistency group has been polarized, the polarization state for the consistency group may be updated to fully polarized. Polarizing at least a portion of the at least one consistency group based upon, at least in part, the polarization state defined for the at least one consistency group may include polarizing additional volumes of the at least one consistency group to be available on the same storage system. Polarizing at least a portion of the at least one consistency group based upon, at least in part, the polarization state defined for the at least one consistency group may include polarizing at least a portion of the one or more consistency groups at a volume granularity.

In another example implementation, a computer program product resides on a computer readable medium that has a plurality of instructions stored on it. When executed by a processor, the instructions cause the processor to perform operations that may include, but are not limited to, dividing a plurality of volumes replicated across a pair of storage systems into one or more consistency groups. A polarization state may be defined for each consistency group. An input-output (IO) failure associated with at least one consistency group may be detected. At least a portion of the at least one consistency group may be polarized based upon, at least in part, the polarization state defined for the at least one consistency group.

One or more of the following example features may be included. Defining the polarization state for each consistency group may include defining the polarization state as one of: online, partially polarized, and fully polarized. Polarizing at least a portion of the at least one consistency group based upon, at least in part, the polarization state defined for the at least one consistency group may include: determining that the polarization state for a consistency group is online; polarizing at least a portion of the consistency group using a witness node; identifying an active storage system and a passive storage system; defining a bias for the consistency group; and updating the polarization state for the consistency group to partially polarized. Polarizing at least a portion of the at least one consistency group based upon, at least in part, the polarization state defined for the at least one consistency group may include: determining that the polarization state for the consistency group is partially polarized; and polarizing at least a portion of the consistency group based upon, at least in part, the bias defined for the consistency group. It may be determined whether each volume of the consistency group has been polarized. In response to determining that each volume of the consistency group has not been polarized, the polarization state for the consistency group may be maintained as partially polarized. In response to determining that each volume of the consistency group has been polarized, the polarization state for the consistency group may be updated to fully polarized. Polarizing at least a portion of the at least one consistency group based upon, at least in part, the polarization state defined for the at least one consistency group may include polarizing additional volumes of the at least one consistency group to be available on the same storage system. Polarizing at least a portion of the at least one consistency group based upon, at least in part, the polarization state defined for the at least one consistency group may include polarizing at least a portion of the one or more consistency groups at a volume granularity.

In another example implementation, a computing system includes at least one processor and at least one memory architecture coupled with the at least one processor, wherein the at least one processor configured to divide a plurality of volumes replicated across a pair of storage systems into one or more consistency groups, wherein the at least one processor is further configured to define a polarization state for each consistency group, wherein the at least one processor is further configured to detect an input-output (IO) failure associated with at least one consistency group, and wherein the at least one processor is further configured to polarize at least a portion of the at least one consistency group based upon, at least in part, the polarization state defined for the at least one consistency group.

One or more of the following example features may be included. Defining the polarization state for each consistency group may include defining the polarization state as one of: online, partially polarized, and fully polarized. Polarizing at least a portion of the at least one consistency group based upon, at least in part, the polarization state defined for the at least one consistency group may include: determining that the polarization state for a consistency group is online; polarizing at least a portion of the consistency group using a witness node; identifying an active storage system and a passive storage system; defining a bias for the consistency group; and updating the polarization state for the consistency group to partially polarized. Polarizing at least a portion of the at least one consistency group based upon, at least in part, the polarization state defined for the at least one consistency group may include: determining that the polarization state for the consistency group is partially polarized; and polarizing at least a portion of the consistency group based upon, at least in part, the bias defined for the consistency group. It may be determined whether each volume of the consistency group has been polarized. In response to determining that each volume of the consistency group has not been polarized, the polarization state for the consistency group may be maintained as partially polarized. In response to determining that each volume of the consistency group has been polarized, the polarization state for the consistency group may be updated to fully polarized. Polarizing at least a portion of the at least one consistency group based upon, at least in part, the polarization state defined for the at least one consistency group may include polarizing additional volumes of the at least one consistency group to be available on the same storage system. Polarizing at least a portion of the at least one consistency group based upon, at least in part, the polarization state defined for the at least one consistency group may include polarizing at least a portion of the one or more consistency groups at a volume granularity.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
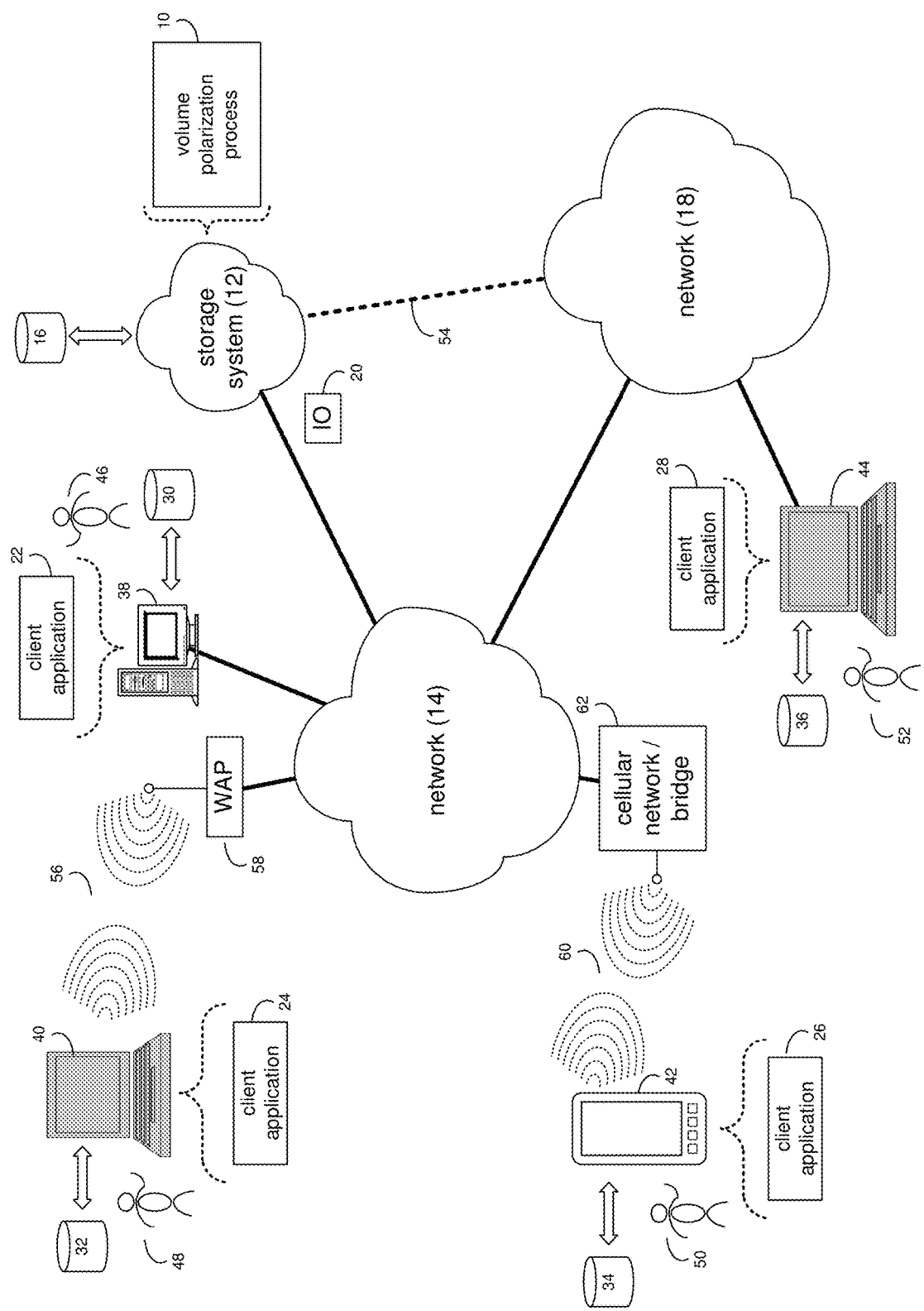
FIG. 1 is an example diagrammatic view of a storage system and a volume polarization process coupled to a distributed computing network according to one or more example implementations of the disclosure.

System Overview:

Referring to FIG. 1, there is shown volume polarization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of volume polarization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of volume polarization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a volume polarization process, such as volume polarization process 10 of FIG. 1, may include but is not limited to, dividing a plurality of volumes replicated across a pair of storage systems into one or more consistency groups. A polarization state may be defined for each consistency group. An input-output (IO) failure associated with at least one consistency group may be detected. At least a portion of the at least one consistency group may be polarized based upon, at least in part, the polarization state defined for the at least one consistency group.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
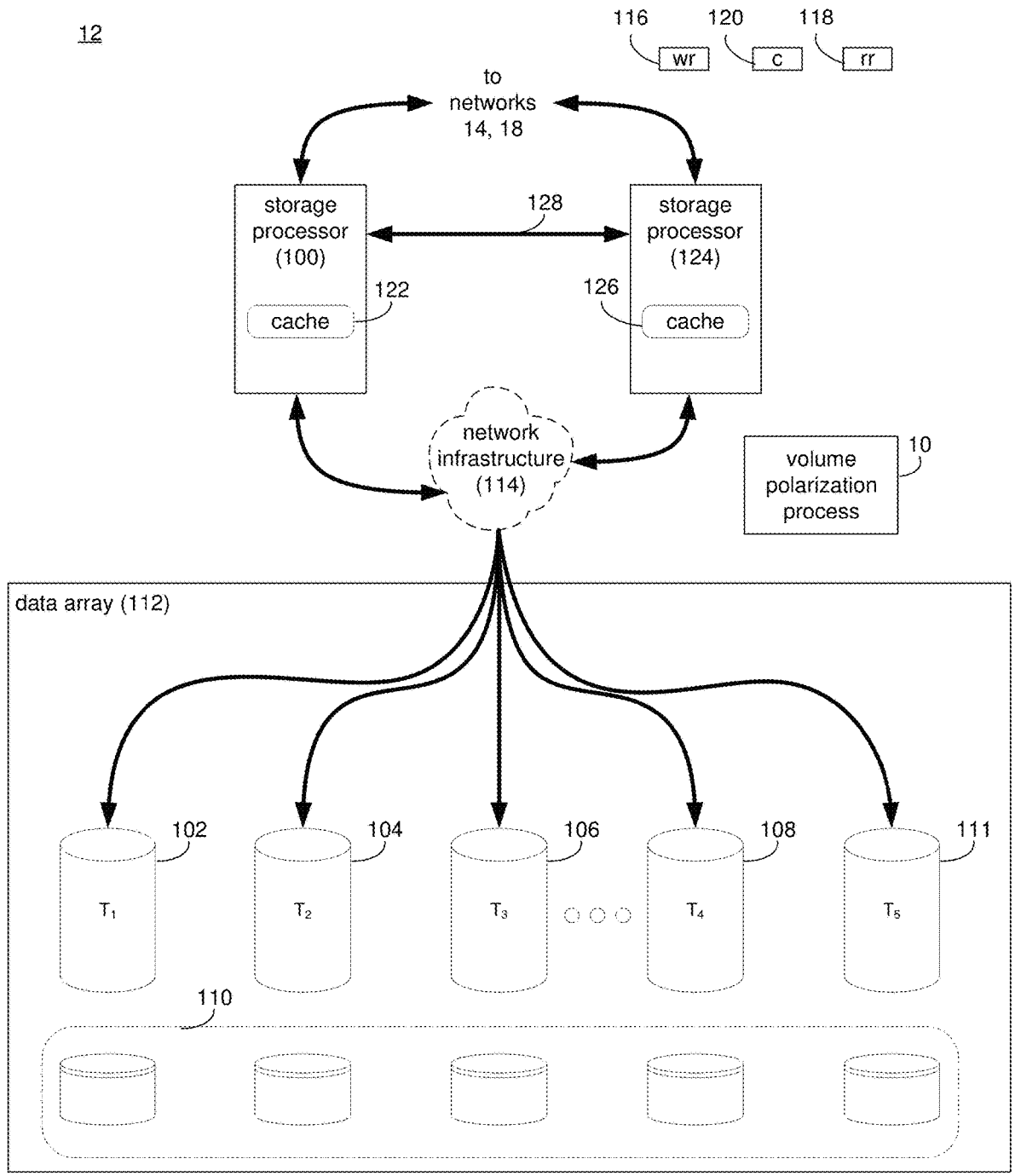
FIG. 2 is an example diagrammatic view of the storage system of FIG. 1 according to one or more example implementations of the disclosure.
Figure 3:
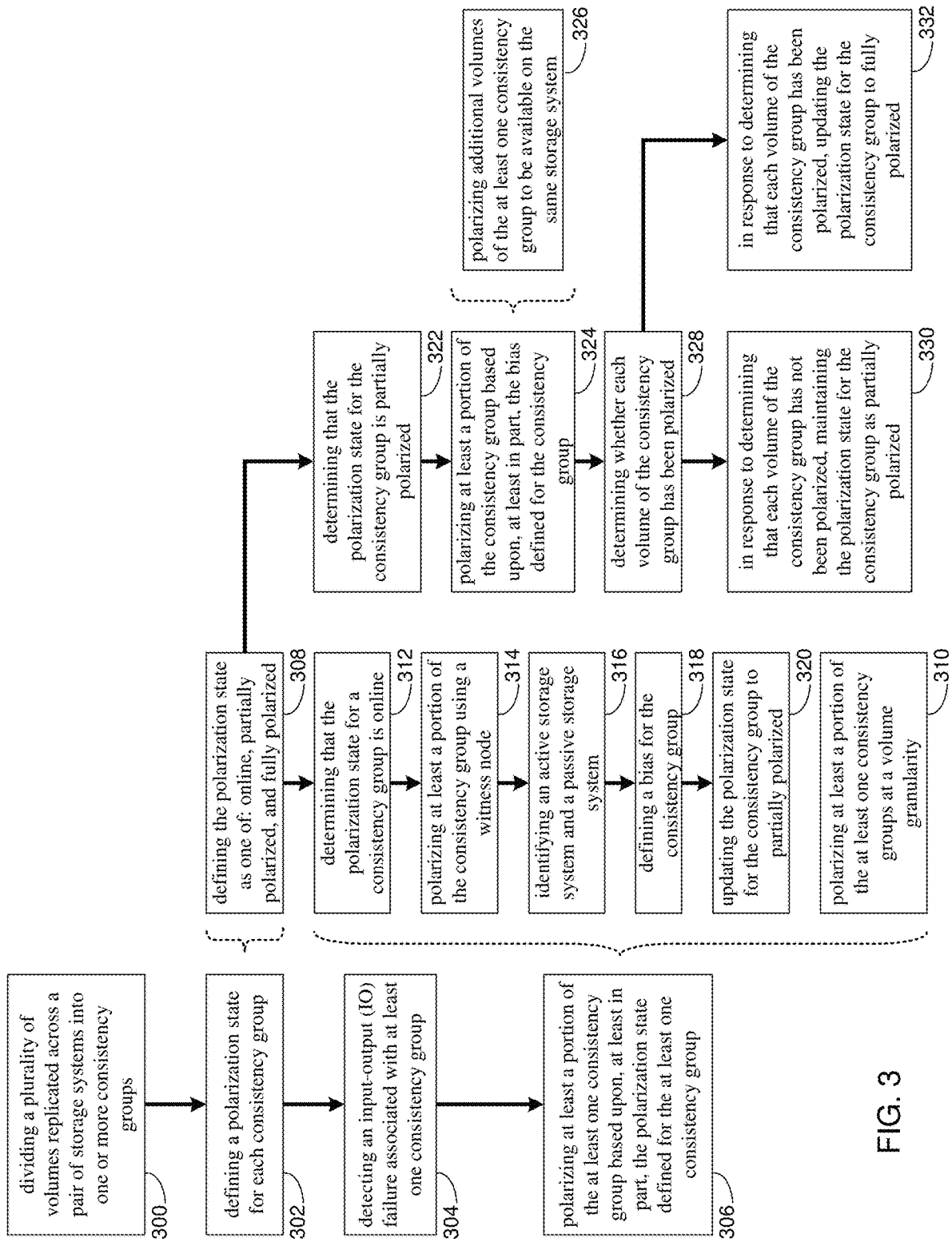
FIG. 3 is an example flowchart of volume polarization process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of volume polarization process 10. The instruction sets and subroutines of volume polarization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of volume polarization process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of volume polarization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of volume polarization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Volume Polarization Process:

Referring also to FIGS. 3-8 and in some implementations, volume polarization process 10 may divide 300 a plurality of volumes replicated across a pair of storage systems into one or more consistency groups. A polarization state may be defined 302 for each consistency group. An input-output (IO) failure associated with at least one consistency group may be detected 304. At least a portion of the at least one consistency group may be polarized 306 based upon, at least in part, the polarization state defined for the at least one consistency group.

As will be discussed in greater detail below, volume polarization process 10 may address challenges with conventional approaches to servicing volumes during IO failures between a pair of storage systems. Consider an active/active configuration where two storage systems present a single volume. The volume data may be available through paths going to both systems. Every IO write request to one storage system may be replicated to the other storage system synchronously. The two storage systems may maintain a cluster between them (e.g., via a Time to Live (TTL) mechanism, where a "preferred" storage system grants TTL to its peer, the "non-preferred" storage system). In this configuration, once the TTL expires for the non-preferred storage system, the non-preferred storage system may go offline. In particular, once it is impossible to replicate writes between the two storage systems within the TTL, one of the storage systems must stop servicing all IO requests to the host(s) before allowing the other storage system to proceed. This process is generally referred to as polarization.

In some implementations, a witness node may be deployed to determine which storage system to continue using for IO requests and which storage system to stop processing IO requests upon (i.e., to manage the polarization of the pair of storage systems). When communication between the two storage systems fail in the presence of a witness node, the preferred storage system may not "win" automatically. Instead and as is known in the art, the first storage system to obtain the witness' "vote" may be configured to continue to process IO requests to the host(s), while the other storage system may be configured to stop serving IO requests to the host(s). In some implementations, the preferred storage system may obtain a "head-start" in contacting the witness node.

However, when multiple volumes are replicated between the two storage systems, problems may arise when polarizing the volumes. For example, when an input-output (IO) failure is detected, there are multiple options for polarizing the volumes within the pair of storage systems: 1) polarize just the affected volume(s) such that each of the affected volumes will continue on only one of the two storage systems; 2) divide the volumes into volume groups and polarize all the volumes in any volume group that has been affected; and 3) polarize all volumes between the storage systems.

In some implementations, polarizing just the affected volume(s) may be ideal if the reason for the polarization is limited and transient. For example, when a single IO write fails on one volume and cannot be replicated before the host IO timeout, or when meta-data is corrupted for a single volume, an IO failure may be detected. In these cases, the fastest recovery may be to polarize just this volume and recover the volume via asynchronous replication. Polarizing more volumes may be heavy handed when the reason for polarization is limited and transient. For example, polarizing large groups of volumes may elongate an otherwise simple recovery to hours or days of data resynchronization, incurring unnecessary performance penalty on the user, and unnecessarily reducing data protection for volumes unrelated to the replication failure.

In some implementations, polarizing a volume group may be ideal if a replication failure affects interconnected volumes. Consider a database spread on e.g., ten volumes, where communication problems cause IO requests to fail on some of these volumes. If each volume goes through polarization independently, it is possible, with a witness node, that some volumes may end up online on one storage system with other volumes online on the other storage system. In this example, neither storage system has a consistent up-to-date version of the data. Accordingly, if communication between the two storage systems were to fail, data for the entire group of volumes would be unavailable until a connection is resumed. Additionally, any single storage system failure may result in data loss.

Therefore, using the first method may cause data inconsistency and potential data loss. However, as explained above, in some cases (such as a transient failure) polarizing the entire group of volumes may cause lengthy recovery. Additionally, it may be beneficial to customers to have, in case of link loss between storage systems, all volumes available on one storage system (e.g., to enable enterprise consistency between databases). This option may allow for volume groups to remain available on different storage systems as a result of polarization.

Finally, polarizing all volumes within the pair of storage systems may be the most extreme solution. For example, such an approach may guarantee the highest level of consistency, for example across multiple databases in the storage system (i.e., "enterprise consistency"), but will result in the longest recovery and highest performance penalty experienced by users.

As will be discussed in greater detail below, implementations of the present disclosure may define a polarization state for a plurality of consistency groups and polarize at least a portion of the volumes replicated across a pair of storage systems based upon, at least in part, the polarization state defined for particular consistency groups. In this manner, volume polarization process 10 may dynamically adjust how volumes are polarized such that an initial polarization bias for one or more volumes of a particular consistency group "crystallizes" with subsequent volume polarization. Accordingly, volume polarization process 10 may preserve consistency in all cases, while minimizing recovery time in the event of volume-specific replication failure or a transient problem.

In some implementations, volume polarization process 10 may divide 300 a plurality of volumes replicated across a pair of storage systems into one or more consistency groups. In some implementations, a volume may generally include a logical memory device configured for storing data. In some implementations, a volume may be accessible by multiple nodes of a multi-node storage system. As shown in the example of FIG. 2 and in some implementations, a volume may be generated for a storage system (e.g., mapped to underlying physical memory).

Figure 4:
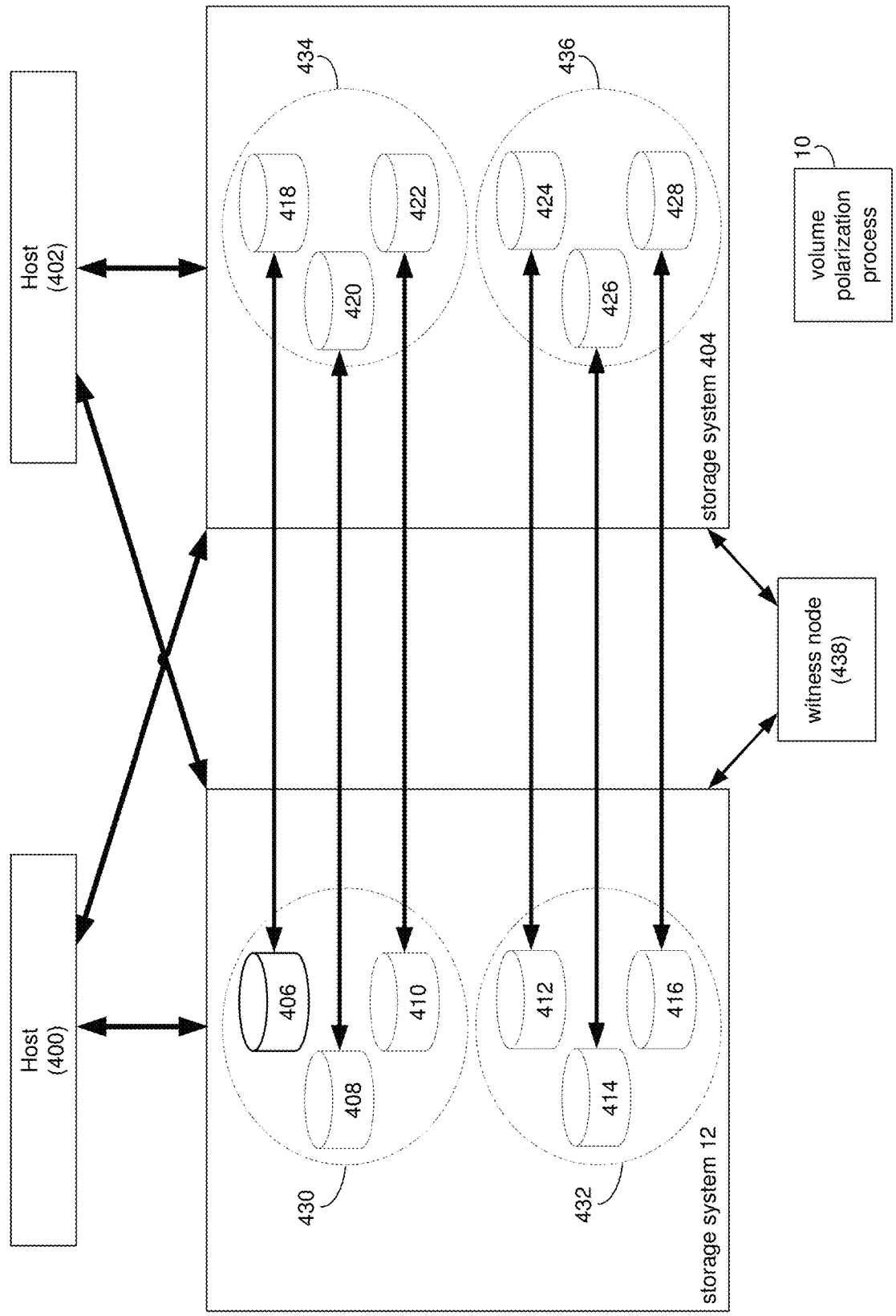
FIGS. 4-8 are example diagrammatic views of the storage system of FIG. 1 according to one or more example implementations of the disclosure.
Figure 5:
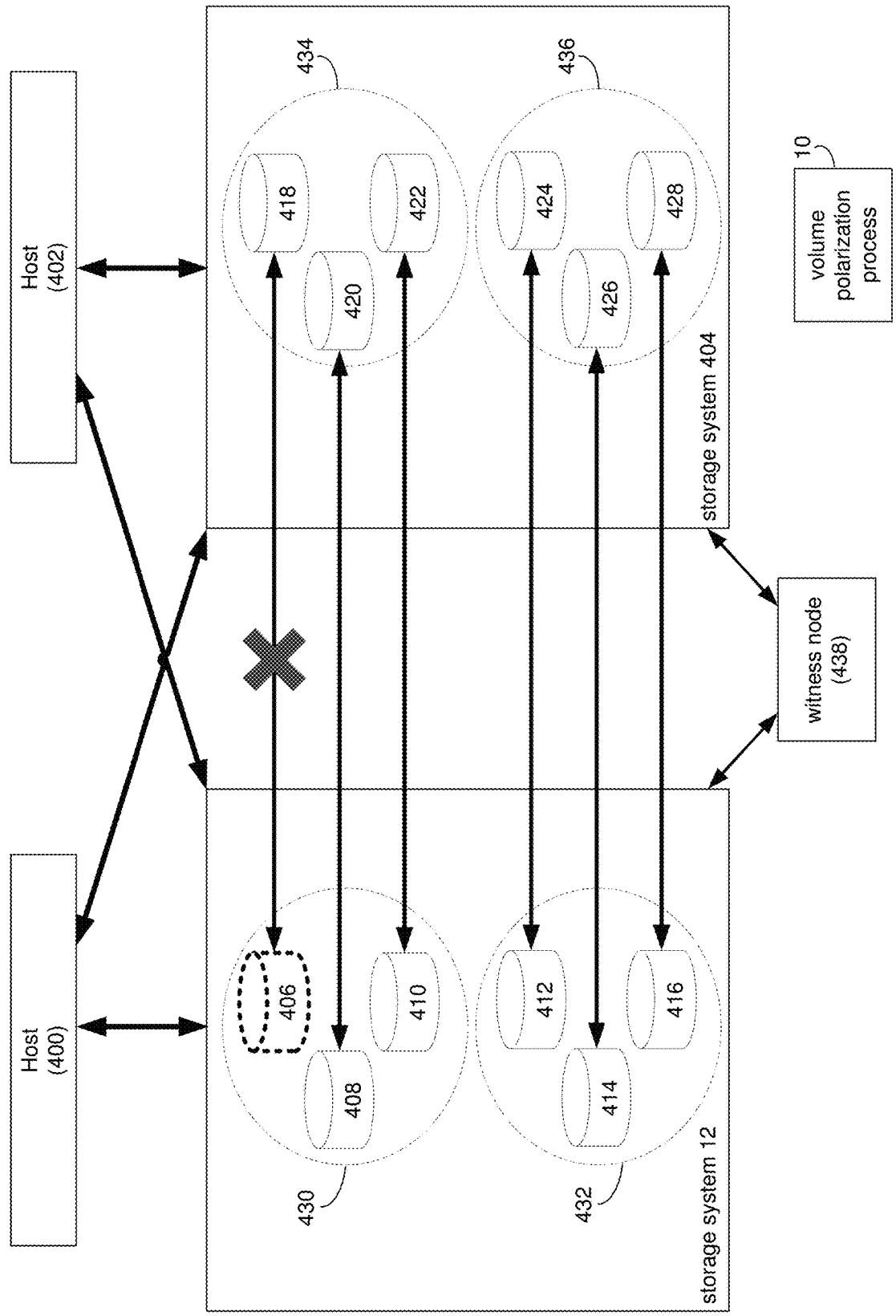

In some implementations and referring also to FIG. 4, multiple nodes or multiple storage systems may access a volume and may present the volume to one or more hosts (e.g., hosts 400, 402). In this manner, a host (e.g., hosts 400, 402) may access a volume with multiple nodes and/or across multiple storage systems. In some implementations, a host (e.g., hosts 400, 402) may generally include a computing device configured to access one or more storage systems (e.g., storage system 12 and storage system 404 as shown in FIGS. 4-8). In one example, hosts 400, 402 may be VMWare ESXi® hypervisors configured to deploy and serve virtual machines. However, it will be appreciated that any computing device may be used as a host within the scope of the present disclosure. In some implementations, multiple storage systems (e.g., storage systems 12, 404) may be configured in an active/active configuration where copies of a volume are generated and synchronized on each storage system but presented to a host (e.g., hosts 400, 402) as a single volume.

In some implementations, volume polarization process 10 may provide a user interface to allow a user to divide a plurality of replicated volumes into non-overlapping consistency groups. A consistency group may generally include a group of distinct volumes that are considered a set. For example and as will be discussed in greater detail below, the volumes of a consistency group may be polarized together such that all volumes of a consistency group are accessible on the same storage system in the event that each volume of the consistency group is polarized. In some implementations, volume polarization process 10 may initially divide 300 volumes into default consistency groups that may be modified by a user.

In some implementations, volume polarization process 10 may divide 300 volumes into a plurality of consistency groups where each consistency group has a single volume, multiple volumes, or even all volumes in a storage system. In some implementations, when dividing 300 the plurality of replicated volumes into the plurality of consistency group, volume polarization process 10 may define a bias for each consistency group. A bias may generally include a preference for a particular storage array to use to access the volume in the event of polarization (i.e., a "preferred" storage system). In some implementations, volume polarization process 10 may define a default bias that may be modified by a user (e.g., via a user interface).

Referring again to FIG. 4 and in some implementations, suppose storage system 12 and storage system 404 are configured in an active/active relationship such that a plurality of volumes (e.g., volumes 406, 408, 410, 412, 414, 416, 418, 420, 422, 424, 426, 428) are replicated across both storage systems. For example, volume 406 on storage system 12 may be replicated as volume 418 on storage system 404; volume 408 on storage system 12 may be replicated as volume 420 on storage system 404; volume 410 on storage system 12 may be replicated as volume 422 on storage system 404; volume 412 on storage system 12 may be replicated as volume 424 on storage system 404; volume 414 on storage system 12 may be replicated as volume 426 on storage system 404; and volume 416 on storage system 12 may be replicated as volume 428 on storage system 404. While an example with e.g., six replicated volumes has been described above, it will be appreciated that any number of volumes may be replicated to any number of storage systems within the scope of the present disclosure.

In this example, suppose that volume polarization process 10 divides 300 (e.g., via a user selection and/or an automatic selection) volumes 406, 408, 410 into consistency group 430 and volumes 412, 414, 416 into consistency group 432. As discussed above, each consistency group may be non-overlapping with respect to each other consistency group. In this manner, volume polarization process 10 may replicate consistency group 430 on storage system 12 as consistency group 434 on storage system 404, and consistency group 432 on storage system 12 as consistency group 436 on storage system 404. As such, any discussion relative to consistency group 430 may include consistency group 434 and any discussion relative to consistency group 432 may include consistency group 436 as these consistency groups are identical. While an example of e.g., two consistency groups has been described above, it will be appreciated that volume polarization process 10 may divide 300 any number of volumes into any number of consistency groups within the scope of the present disclosure.

In some implementations, storage systems 12 and 404 may be communicatively coupled to one or more witness nodes (e.g., witness node 438). As is known in the art, a witness node (e.g., witness node 438) may generally include a hardware and/or software module configured to determine which storage system to use for a volume when polarizing the volume and may override storage system preferences for a storage system (i.e., designation of a preferred storage system) to promote for particular volumes in the presence of additional failures. In some implementations, each consistency group (e.g., consistency groups 430, 432) may use the same witness node (e.g., witness node 438) for determining which storage system to use for the consistency group when polarizing, each with its own unique session and session ID. In some implementations, each consistency group (e.g., consistency groups 430, 432) may use different witness nodes for determining which storage system to use for the consistency group when polarizing. In this manner, one consistency group's determination by a witness node for a storage system to use for polarizing the consistency group may not impact other consistency groups' determination (e.g., by the same witness node or by another witness node).

In some implementations and as will be discussed in greater detail below, each consistency group may track or maintain a record where volumes are available. For example, when a consistency group is in an "online" polarization state, the consistency group may indicate that the volumes of that consistency group are available on both storage systems. When the consistency group is in a "partially polarized" or "fully polarized" polarization state, the consistency group may indicate which storage system each volume is available on. As will be discussed in greater detail below, volume polarization process 10 may prevent polarization of some volumes for access only on one storage system while polarizing other volumes for access only on the other storage system.

In some implementations, volume polarization process 10 may define 302 a polarization state for each consistency group. A polarization state may generally include a description or indication of the amount or level of polarizing for a consistency group. For example and in some implementations, defining 302 the polarization state for each consistency group may include defining 308 the polarization state as one of: online, partially polarized, and fully polarized. An "online" polarization state may indicate that the volumes of the consistency group are in a normal, active/active configuration. As such, each volume is accessible on each storage system. A "partially polarized" polarization state may indicate that some volumes of the consistency group are polarized. A "fully polarized" polarization state may indicate that all volumes of the consistency group are polarized. While three example polarization states have been described, it will be appreciated that fewer or additional polarization states may be defined 302 for each consistency group within the scope of the present disclosure. Referring again to FIG. 4, suppose that no volumes have been polarized in any consistency group (e.g., consistency groups 430, 432). In this example, volume polarization process 10 may define 308 the polarization state for consistency groups 430, 432 as "online".

In some implementations, volume polarization process 10 may detect 304 an input-output (IO) failure associated with at least one consistency group. An IO failure may generally include any failure during the processing of an IO request on a volume. For example, IO failures may result from a single write request failing on one volume that cannot be replicated within host IO timeout. Another example of an IO failure may be a meta-data corruption for a single volume. Another example of an IO failure may result from a system level problem (e.g., such as all links being down or one of the storage systems failing). Accordingly, any failure that prevents an IO request from being completed may be detected 304 as an IO failure.

In some implementations, volume polarization process 10 may polarize 306 at least a portion of the at least one consistency group based upon, at least in part, the polarization state defined for the at least one consistency group. As discussed above and in some implementations, polarization may generally include the determination of a storage system to use when processing IO requests for a particular volume and the determination of a storage system to stop using when processing IO requests for the particular volume, in response to an IO failure. In some implementations and as will be discussed in greater detail below, volume polarization process 10 may utilize the polarization state defined for a particular consistency group to determine how to polarize volumes of that consistency group.

In some implementations, polarizing 306 at least a portion of the at least one consistency group based upon, at least in part, the polarization state defined for the at least one consistency group may include polarizing 310 at least a portion of the at least one consistency group at a volume granularity. For example, volume polarization process 10 may detect 304 an IO failure at a volume level or volume granularity. In this manner, polarization may be performed at a volume granularity. In some implementations, by performing polarization at a volume granularity, a small hiccup in network connectivity, a transient failure or a volume level problem (such as meta-data corruption) will not force all volumes to polarize. In other words, volume polarization process 10 may prevent unnecessary recovery processes and may provide higher performance access to other volumes not subject to an IO failure than possible with conventional approaches. As will be discussed in greater detail below, volume polarization process 10 may incrementally polarize 310 (e.g., volume-by-volume) the volumes of a consistency group to balance the possibility of an IO failure resulting from volume-specific problems with the protection against larger storage system failures.

In some implementations, polarizing 306 at least a portion of the at least one consistency group based upon, at least in part, the polarization state defined for the at least one consistency group may include determining 312 that the polarization state for a consistency group is online. For example and referring also to FIG. 5, suppose volume polarization process 10 detects 304 an IO failure associated with volume 406/volume 418 (e.g., represented as an "X" on the arrow between volume 406 of storage system 12 and volume 418 of storage system 404). In this example, volume polarization process 10 may determine the polarization state for consistency group 430. As discussed above, consistency group 430 may, prior to this detected IO failure, not have any volumes polarized. Accordingly, volume polarization process 10 may determine 312 from consistency group 430 (e.g., from metadata stored within or referencing consistency group 430) that the polarization state for consistency group 430 is online.

In some implementations, polarizing 306 at least a portion of the at least one consistency group when the polarization state for a consistency group is online may include polarizing 314 at least a portion of the consistency group using a witness node. For example and as discussed above, a witness node may be configured to determine which storage system to use to access a particular volume during polarization. In some implementations, the witness node may override storage system preferences for a storage system (i.e., designation of a preferred storage system) to promote for particular volumes in the presence of additional failures. Referring again to FIG. 5 and continuing with the above example, witness node 438 may determine for volume 406/volume 418 that storage system 404 is to provide access to volume 418. In this manner, volume polarization process 10 may polarize 314 volume 406 on storage system 12 and volume 418 on storage system 404 by preventing access to volume 406 on storage system 12 and only providing access to volume 418 on storage system 404 (e.g., represented by volume 406 on storage system 12 being rendered with dotted lines). While an example of witness node 438 determining that storage system 404 is preferred for polarizing volume 406/volume 418, it will be appreciated that witness node 438 may, for different circumstances, determine that storage system 12 is preferred. Accordingly, it will be appreciated that the above designation of storage system 404 as the preferred storage system is for example purposes only.

In some implementations, polarizing 306 at least a portion of the at least one consistency group when the polarization state for a consistency group is online may include identifying 316 an active storage system and a passive storage system. An active storage system may generally include the storage system chosen by the witness node to actively provide access to the at least a portion of the at least one consistency group polarized in response to the detected IO failure. Similarly, a passive storage system may generally include the storage system not chosen by the witness node to actively provide access to the at least a portion of the at least one consistency group polarized in response to the detected IO failure. Continuing with the above example, volume polarization process 10 may identify storage system 404 as the active storage system and storage system 12 as the passive storage system for volume 406/volume 418.

In some implementations, polarizing 306 at least a portion of the at least one consistency group when the polarization state for a consistency group is online may include defining 318 a bias for the consistency group. As discussed above, a bias may generally include a preference for a particular storage array to use to access the volume in the event of polarization (i.e., a "preferred" storage system). In some implementations, the witness node may override the pre-defined bias for a storage system to use to access a particular volume. In this manner, a bias may be defined 318 for the consistency group when the first volume(s) of a consistency group are polarized based upon, at least in part, the bias defined by the witness node. For example and as will be discussed in greater detail below, the witness node may define the bias (i.e., the direction of polarization) for the rest of the consistency group. Continuing with the above example, volume polarization process 10 may define 317 a bias for consistency group 430 to use storage system 404 for accessing polarized volumes of consistency group 430.

In some implementations, polarizing 306 at least a portion of the at least one consistency group when the polarization state for a consistency group is online may include updating 320 the polarization state for the consistency group to partially polarized. For example and in response to polarizing 314 at least a portion of the at least one consistency group, volume polarization process 10 may update 320 the polarization state for the consistency group to partially polarized. Continuing with the above example, volume polarization process 10 may update 320 the polarization state for consistency group 430 from online to partially polarized. As will be discussed in greater detail below, volume polarization process 10 may polarize 306 subsequent volumes of consistency group 430 based upon, at least in part, the changed polarization state for consistency group 430 (i.e., partially polarized).

In some implementations, volume polarization process 10 may disable the witness node in response to updating 320 the polarization state from online to partially polarized. For example and as discussed above, volume polarization process 10 may utilize the witness node to determine the bias for the first volume polarization of a consistency group. However, to prevent the situation where the witness node changes bias for different volumes of the same consistency group, volume polarization process 10 may use the bias defined for the first polarization event for all subsequent polarizations of volumes of the same consistency group.

Figure 6:
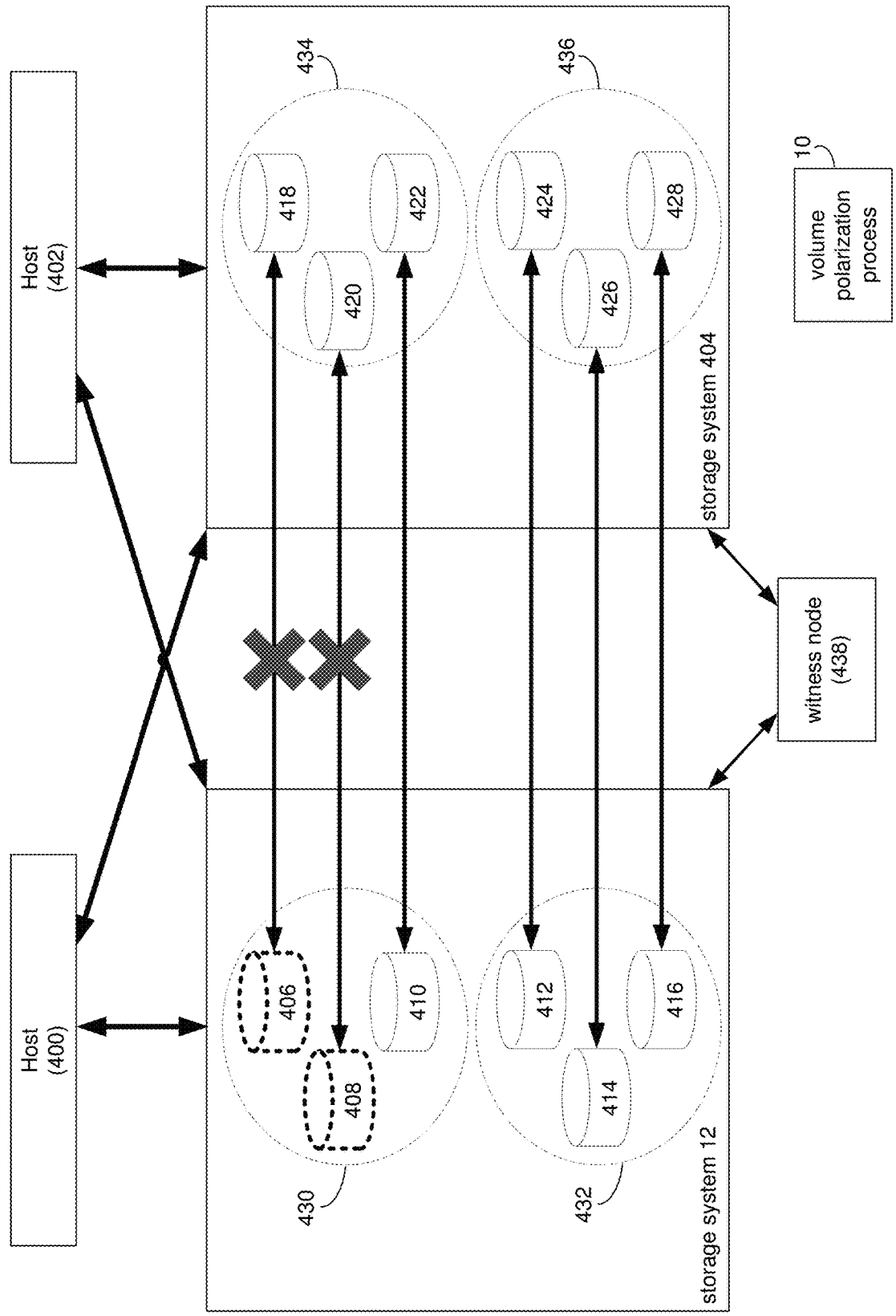

In some implementations, polarizing 306 at least a portion of the at least one consistency group based upon, at least in part, the polarization state defined for each consistency group may include determining 322 that the polarization state for the consistency group is partially polarized. Referring also to FIG. 6, suppose that volume polarization process 10 detects 304 another IO failure associated with consistency group 430. In this example, suppose volume polarization process 10 detects 304 an IO failure associated with volume 408/volume 420 (e.g., represented as an "X" on the arrow between volume 408 of storage system 12 and volume 420 of storage system 404). In this example, volume polarization process 10 may determine the polarization state for consistency group 430. As discussed above, consistency group 430 may, prior to this detected IO failure, have polarized access to volume 418 on storage system 404. Accordingly, volume polarization process 10 may determine 322 from consistency group 430 (e.g., from metadata stored within or referencing consistency group 430) that the polarization state for consistency group 430 is partially polarized.

In some implementations, polarizing 306 at least a portion of the at least one consistency group when the polarization state for a consistency group is partially polarized may include polarizing 324 at least a portion of the consistency group based upon, at least in part, the bias defined for the consistency group. In some implementations, volume polarization process 10 may utilize the bias defined for the consistency group to polarize 326 additional volumes of the at least one consistency group to be available on the same storage system. In this manner, volume polarization process 10 may prevent different volumes from the same consistency group from being polarized on separate storage systems.

Referring again to FIG. 6 and continuing with the above example, volume polarization process 10 may polarize 324 volume 408 on storage system 12 and volume 420 on storage system 404 by preventing access to volume 408 on storage system 12 and only providing access to volume 420 on storage system 404 based upon, at least in part, the bias defined for consistency group 430 (e.g., the bias for consistency group 430 to use storage system 404 for accessing polarized volumes of consistency group 430). This polarization is represented in FIG. 6 with volume 408 being rendered in dotted lines. In this example, both volumes 418 and 420 are polarized for access only via storage system 404.

In some implementations, volume polarization process 10 may determine 328 whether each volume of the consistency group has been polarized. Referring again to FIG. 6 and continuing with the above example, suppose that volumes 418 and 420 have been polarized to storage system 404. In this example, volume 410 may be accessible on storage system 12 and as volume 422 on storage system 404. Accordingly, volume polarization process 10 may determine 328 that each volume of consistency group 430 has not been polarized.

In some implementations and in response to determining that each volume of the consistency group has not been polarized, volume polarization process 10 may maintain 330 the polarization state for the consistency group as partially polarized. Continuing with the above example and in response to determining 328 that each volume of consistency group 430 has not been polarized, volume polarization process 10 may maintain 330 the polarization state for consistency group 430 as partially polarized.

Figure 7:
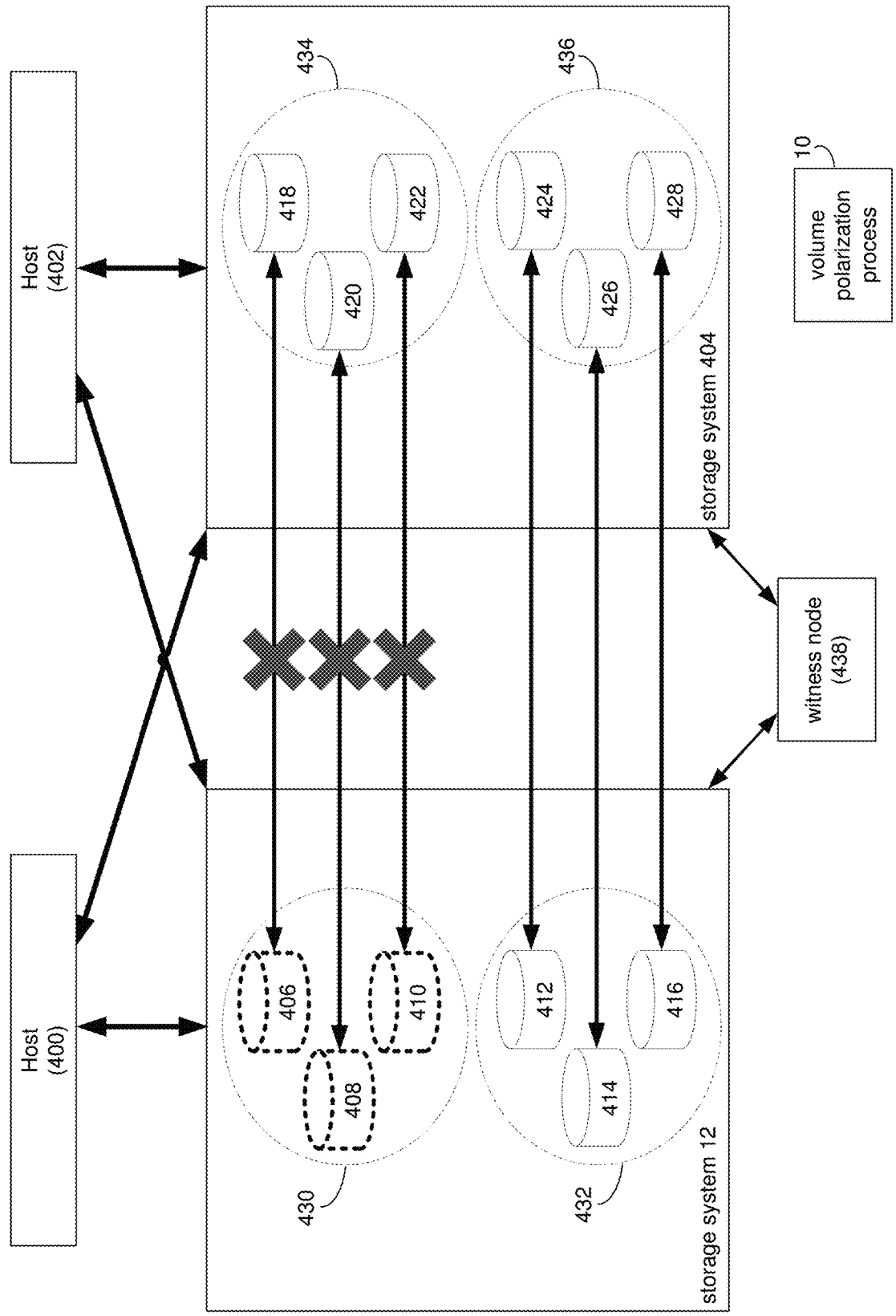
Figure 8:
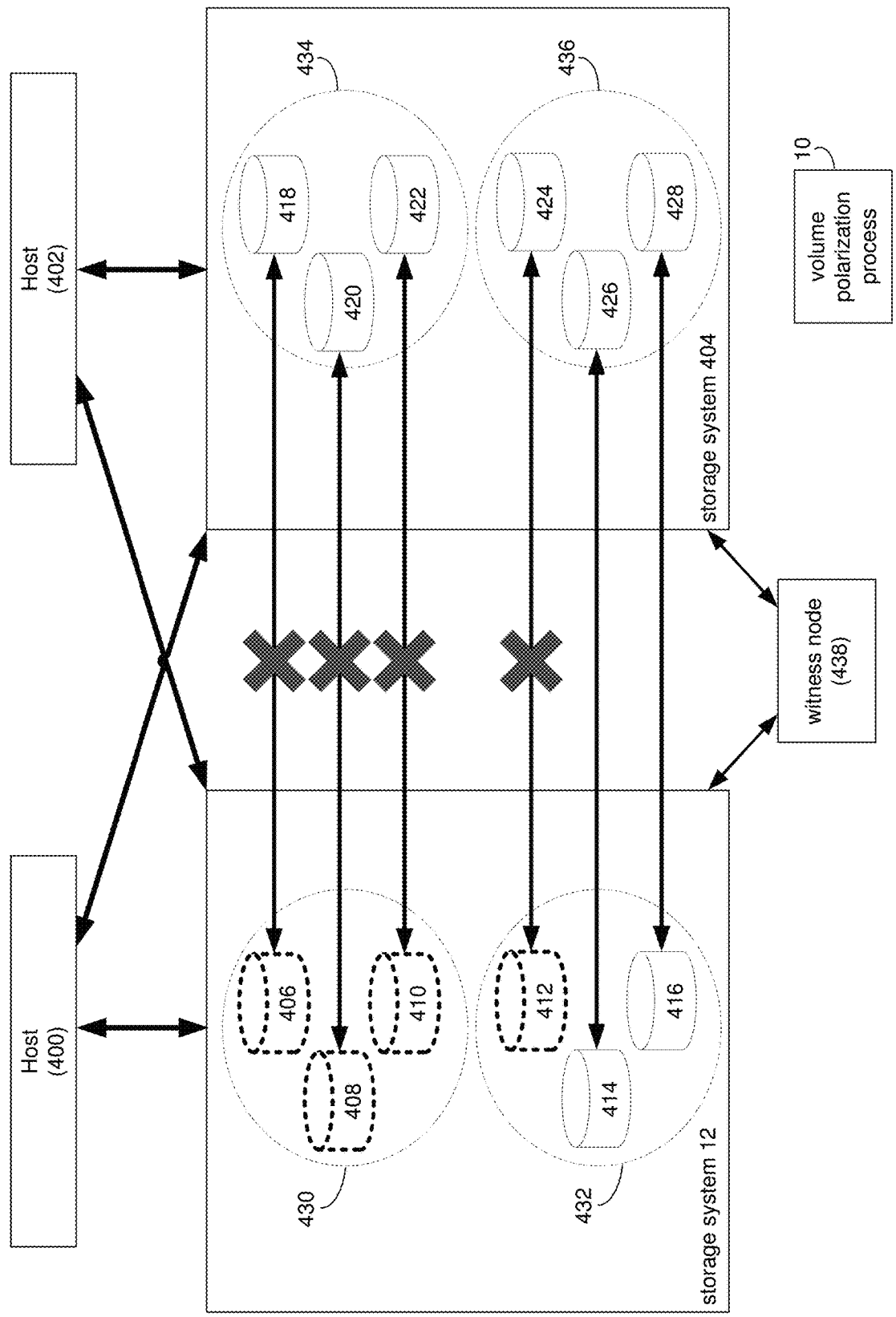

Referring also to FIG. 7 and continuing with the above example, suppose that volume polarization process 10 detects 304 another IO failure associated with consistency group 430. In this example, suppose volume polarization process 10 detects 304 an IO failure associated with volume 410/volume 422 (e.g., represented as an "X" on the arrow between volume 410 of storage system 12 and volume 422 of storage system 404). In this example, volume polarization process 10 may determine the polarization state for consistency group 430. As discussed above, consistency group 430 may, prior to this detected IO failure, have polarized volumes 418 and 420 for access only by storage system 404. Accordingly, volume polarization process 10 may determine 322 from consistency group 430 (e.g., from metadata stored within or referencing consistency group 430) that the polarization state for consistency group 430 is partially polarized.

As discussed above, volume polarization process 10 may utilize the bias defined for the consistency group to prevent different volumes from the same consistency group from being polarized on separate storage systems. Referring again to FIG. 7 and continuing with the above example, volume polarization process 10 may polarize 324 volume 410 on storage system 12 and volume 422 on storage system 404 by preventing access to volume 410 on storage system 12 and only providing access to volume 422 on storage system 404 based upon, at least in part, the bias defined for consistency group 430 (e.g., the bias for consistency group 430 to use storage system 404 for accessing polarized volumes of consistency group 430). This polarization is represented in FIG. 7 with volume 410 being rendered in dotted lines. In this example, volumes 418, 420, 424 are polarized for access only via storage system 404.

In some implementations and in response to determining 328 that each volume of the consistency group has been polarized, volume polarization process 10 may update 332 the polarization state for the consistency group to fully polarized. Referring again to FIG. 7 and continuing with the above example, suppose that volumes 406, 408, 410 have been polarized for access only via storage system 404. In this example, volume polarization process 10 may determine 328 that each volume of consistency group 430 has been polarized. In response to determining 328 that each volume of consistency group 430 has been polarized, volume polarization process 10 may update 332 the polarization state for consistency group 430 to fully polarized.

In some implementations and as discussed above, when any volume is polarized, volume polarization process 10 may perform asynchronous replication on the polarized volumes until the volumes of each storage system are synchronized and are capable of being synchronously replicated during subsequent IO requests. By performing polarization at a volume granularity and by defining a polarization state for each consistency group, volume polarization process 10 may limit the polarization of volumes of a consistency group to only the volumes that experience IO failures. In this manner, the recovery process (e.g., by asynchronous replication between polarized volumes across the storage systems) may be minimized and applied only where necessary.

In some implementations and in response to a consistency group polarizing (e.g., partially or fully), volume polarization process 10 may create a system-wide hint that increases bias for the storage system where volumes of the consistency group are polarized. For example and referring also to FIG. 8, suppose volume polarization process 10 detects 304 an IO failure associated with volume 412 of consistency group 432 (e.g., represented as an "X" on the arrow between volume 412 of storage system 12 and volume 424 of storage system 404). In this example, volume polarization process 10 may determine the polarization state for consistency group 432. As discussed above, consistency group 432 may, prior to this detected IO failure, has not polarized any volumes. Accordingly, volume polarization process 10 may determine 312 from consistency group 432 (e.g., from metadata stored within or referencing consistency group 432) that the polarization state for consistency group 432 is online. In this example, volume polarization process 10 may polarize 314 volume 412 of consistency group 432 using witness node 438 and/or the bias for other consistency groups.

For example and as discussed above where each volume of consistency group 430 is polarized to storage system 404, volume polarization process 10 may increase the delay of storage system 12 (e.g., the storage system that was not chosen for polarizing the volumes of consistency group 430) before approaching hosts 400, 402 and/or witness node 438. In this example, this may increase the probability that, when multiple consistency groups fail, each consistency group may become available on the same storage system. In this manner, volume polarization process 10 may obtain crystallization on a storage system level. While one example of utilizing the bias of other consistency groups has been described as increasing a delay before approaching a host and/or witness node, it will be appreciated that volume polarization process 10 may achieve crystallization on a storage system level with other techniques within the scope of the present disclosure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    dividing a plurality of volumes replicated across a pair of storage systems into one or more consistency groups, wherein each consistency group is non-overlapping with respect to each other consistency group;
    defining a state for each consistency group, wherein the state includes a description or indication of an amount or a level for each consistency group;
    detecting an input-output (IO) failure associated with at least one consistency group such that at least one storage system of the pair of storage systems stops servicing all IO requests to minimize a recovery time in an event of a volume-specific replication failure or a transient problem; and
    determining which storage system of the pair of storage systems to use for at least a portion of the at least one consistency group based upon, at least in part, the state defined for the at least one consistency group.

2. The computer-implemented method of claim 1, wherein defining the state for each consistency group includes defining the state as one of: online, partially polarized, and fully polarized.

3. The computer-implemented method of claim 2, wherein determining which storage system of the pair of storage systems to use for at least a portion of the at least one consistency group based upon, at least in part, the state defined for the at least one consistency group includes:
    determining that the state for a consistency group is online;
    determining which storage system of the pair of storage systems to use for at least a portion of the consistency group using a witness node;
    identifying an active storage system and a passive storage system;
    defining a bias for the consistency group; and
    updating the state for the consistency group to partially polarized.

4. The computer-implemented method of claim 3, wherein determining which storage system of the pair of storage systems to use for at least a portion of the at least one consistency group based upon, at least in part, the state defined for the at least one consistency group includes:
    determining that the state for the consistency group is partially polarized; and
    determining which storage system of the pair of storage systems to use for at least a portion of the consistency group based upon, at least in part, the bias defined for the consistency group.

5. The computer-implemented method of claim 4, further comprising:
determining whether each volume of the consistency group has been determined which storage system of the pair of storage systems to use;
in response to determining that each volume of the consistency group has not been determined which storage system of the pair of storage systems to use, maintaining the state for the consistency group as partially polarized; and
in response to determining that each volume of the consistency group has been determined which storage system of the pair of storage systems to use, updating the polarization state for the consistency group to fully polarized.

6. The computer-implemented method of claim 4, wherein determining which storage system of the pair of storage systems to use for at least a portion of the at least one consistency group based upon, at least in part, the state defined for the at least one consistency group includes determining which storage system of the pair of storage systems to use for additional volumes of the at least one consistency group to be available on the same storage system.

7. The computer-implemented method of claim 1, wherein determining which storage system of the pair of storage systems to use for at least a portion of the at least one consistency group based upon, at least in part, the state defined for the at least one consistency group includes determining which storage system of the pair of storage systems to use for at least a portion of the at least one consistency groups at a volume granularity.

8. A computer program product residing on a non-transitory computer readable medium having a plurality of instructions stored thereon which, when executed by a processor, cause the processor to perform operations comprising:
dividing a plurality of volumes replicated across a pair of storage systems into one or more consistency groups, wherein each consistency group is non-overlapping with respect to each other consistency group;
defining a state for each consistency group, wherein the state includes a description or indication of an amount or a level for each consistency group;
detecting an input-output (IO) failure associated with at least one consistency group such that at least one storage system of the pair of storage systems stops servicing all IO requests to minimize a recovery time in an event of a volume-specific replication failure or a transient problem; and
determining which storage system of the pair of storage systems to use for at least a portion of the at least one consistency group based upon, at least in part, the state defined for the at least one consistency group.

9. The computer program product of claim 8, wherein defining the state for each consistency group includes defining the state as one of: online, partially polarized, and fully polarized.

10. The computer program product of claim 9, wherein determining which storage system of the pair of storage systems to use for at least a portion of the at least one consistency group based upon, at least in part, the state defined for the at least one consistency group includes:
determining that the state for a consistency group is online;
determining which storage system of the pair of storage systems to use for at least a portion of the consistency group using a witness node;
identifying an active storage system and a passive storage system;
defining a bias for the consistency group; and
updating the state for the consistency group to partially polarized.

11. The computer program product of claim 10, wherein determining which storage system of the pair of storage systems to use for at least a portion of the at least one consistency group based upon, at least in part, the state defined for the at least one consistency group includes:
determining that the state for the consistency group is partially polarized; and
determining which storage system of the pair of storage systems to use for at least a portion of the consistency group based upon, at least in part, the bias defined for the consistency group.

12. The computer program product of claim 11, wherein the operations further comprise:
determining whether each volume of the consistency group has been determined which storage system of the pair of storage systems to use;
in response to determining that each volume of the consistency group has not been determined which storage system of the pair of storage systems to use, maintaining the state for the consistency group as partially polarized; and
in response to determining that each volume of the consistency group has been determined which storage system of the pair of storage systems to use, updating the polarization state for the consistency group to fully polarized.

13. The computer program product of claim 11, wherein determining which storage system of the pair of storage systems to use for at least a portion of the at least one consistency group based upon, at least in part, the state defined for the at least one consistency group includes determining which storage system of the pair of storage systems to use for additional volumes of the at least one consistency group to be available on the same storage system.

14. The computer program product of claim 8, wherein determining which storage system of the pair of storage systems to use for at least a portion of the at least one consistency group based upon, at least in part, the state defined for the at least one consistency group includes determining which storage system of the pair of storage systems to use for at least a portion of the one or more consistency groups at a volume granularity.

15. A computing system comprising:
a memory; and
a processor configured to divide a plurality of volumes replicated across a pair of storage systems into one or more consistency groups, wherein each consistency group is non-overlapping with respect to each other consistency group, wherein the processor is further configured to define a state for each consistency group, wherein the state includes a description or indication of an amount or a level for each consistency group, wherein the processor is further configured to detect an input-output (IO) failure associated with at least one consistency group such that at least one storage system of the pair of storage systems stops servicing all TO requests to minimize a recovery time in an event of a volume-specific replication failure or a transient problem, and wherein the processor is further configured to determine which storage system of the pair of storage systems to use for at least a portion of the at least one consistency group based upon, at least in part, the polarization state defined for the at least one consistency group.

16. The computing system of claim 15, wherein defining the state for each consistency group includes defining the state as one of: online, partially polarized, and fully polarized.

17. The computing system of claim 16, wherein determining which storage system of the pair of storage systems to use for at least a portion of the at least one consistency group based upon, at least in part, the state defined for the at least one consistency group includes:
    determining that the state for a consistency group is online;
    determining which storage system of the pair of storage systems to use for at least a portion of the consistency group using a witness node;
    identifying an active storage system and a passive storage system;
    defining a bias for the consistency group; and
    updating the state for the consistency group to partially polarized.

18. The computing system of claim 17, wherein determining which storage system of the pair of storage systems to use for at least a portion of the at least one consistency group based upon, at least in part, the state defined for the at least one consistency group includes:
    determining that the state for the consistency group is partially polarized; and
    determining which storage system of the pair of storage systems to use for at least a portion of the consistency group based upon, at least in part, the bias defined for the consistency group.

19. The computing system of claim 18, wherein the processor is further configured to:
    determine whether each volume of the consistency group has been determined which storage system of the pair of storage systems to use;
    in response to determining that each volume of the consistency group has not been determined which storage system of the pair of storage systems to use, maintaining the state for the consistency group as partially polarized; and
    in response to determining that each volume of the consistency group has been determined which storage system of the pair of storage systems to use, updating the polarization state for the consistency group to fully polarized.

20. The computing system of claim 18, wherein determining which storage system of the pair of storage systems to use for at least a portion of the at least one consistency group based upon, at least in part, the state defined for the at least one consistency group includes determining which storage system of the pair of storage systems to use for additional volumes of the at least one consistency group to be available on the same storage system.

* * * * *